US012339946B2

(12) United States Patent
Kotake et al.

(10) Patent No.: US 12,339,946 B2
(45) Date of Patent: Jun. 24, 2025

(54) INFORMATION PROCESSING APPARATUS, AUTHENTICITY VERIFICATION METHOD, AND PROGRAM

(71) Applicant: Hitachi, Ltd., Tokyo (JP)

(72) Inventors: Yuki Kotake, Tokyo (JP); Yukiyoshi Takamura, Tokyo (JP)

(73) Assignee: HITACHI VANTARA, LTD., Yokohama (JP)

( * ) Notice: Subject to any disclaimer, the term of this patent is extended or adjusted under 35 U.S.C. 154(b) by 591 days.

(21) Appl. No.: 17/688,270

(22) Filed: Mar. 7, 2022

(65) Prior Publication Data

US 2023/0119196 A1    Apr. 20, 2023

(30) Foreign Application Priority Data

Oct. 18, 2021 (JP) ................. 2021-170076

(51) Int. Cl.
*G06F 21/44* (2013.01)
*G06F 3/06* (2006.01)

(52) U.S. Cl.
CPC .............. *G06F 21/44* (2013.01); *G06F 3/062* (2013.01); *G06F 3/0655* (2013.01); *G06F 3/0679* (2013.01)

(58) Field of Classification Search
CPC ........ G06F 21/44; G06F 3/062; G06F 3/0655; G06F 3/0679; G06F 3/0637; G06F 3/0688; G06F 2221/2129; G06F 21/79; G06F 21/85; Y02D 10/00
See application file for complete search history.

(56) References Cited

U.S. PATENT DOCUMENTS

| | | | | |
|---|---|---|---|---|
| 9,106,646 | B1* | 8/2015 | Zheng | G06F 21/42 |
| 2006/0200856 | A1* | 9/2006 | Salowey | H04L 9/32 |
| | | | | 726/5 |
| 2007/0079065 | A1* | 4/2007 | Bonella | G06F 13/405 |
| | | | | 711/113 |
| 2008/0301423 | A1* | 12/2008 | Hatano | G06F 21/70 |
| | | | | 713/1 |

(Continued)

FOREIGN PATENT DOCUMENTS

JP    2008-299417 A    12/2008

*Primary Examiner* — Harunur Rashid
(74) *Attorney, Agent, or Firm* — Volpe Koenig

(57) ABSTRACT

Whether a connected drive is an unauthorized drive or not can be judged before it becomes possible for the connected drive to access a memory for a storage controller. When a storage device is connected, an information processing apparatus forms a first communication channel via a first interface incapable of accessing a built-in memory even when the communication connection is established; and a second communication channel via a second interface capable of accessing the built-in memory when the communication connection is established. At a specified timing when the communication connection via the second communication channel is not established, a processor executes authenticity verification processing for verifying authenticity of the storage device on the basis of information acquired from the storage device by using the first communication channel and permits establishment of the communication connection via the second communication channel when the authenticity is confirmed by the authenticity verification processing.

9 Claims, 12 Drawing Sheets

(56) References Cited

U.S. PATENT DOCUMENTS

| | | | |
|---|---|---|---|
| 2011/0159848 A1* | 6/2011 | Pei | G06F 21/42 455/411 |
| 2013/0174238 A1* | 7/2013 | Wang | H04N 21/43615 726/7 |
| 2021/0067487 A1* | 3/2021 | Du | G06F 21/74 |

* cited by examiner

FIG. 6

| STORAGE # 1101 | AUTHENTICATION PATTERN 1102 | PERMITTED/UNPERMITTED 1103 |
|---|---|---|
| 1 | A | IN-BAND LINK PERMITTED |
| | B | IN-BAND LINK PERMITTED |
| | C | IN-BAND LINK PERMITTED |
| | OTHER PATTERNS | UNAUTHORIZED DEVICE LINK UNPERMITTED |
| 2 | A | IN-BAND LINK PERMITTED |
| | B | IN-BAND LINK PERMITTED |
| | C | IN-BAND LINK PERMITTED |
| | D | IN-BAND LINK PERMITTED |
| | OTHER PATTERNS | UNAUTHORIZED DEVICE LINK UNPERMITTED |
| ... | ... | ... |

110

INFORMATION PROCESSING APPARATUS, AUTHENTICITY VERIFICATION METHOD, AND PROGRAM

TECHNICAL FIELD

The present invention relates to an information processing apparatus, an authenticity verification method, and a program and is suited for application to an information processing apparatus, authenticity verification method, and program for verifying authenticity of a connected NVMe (Non-Volatile Memory Express) drive.

BACKGROUND ART

In recent years, there has been an increase in security needs for information equipment and also an increase in needs for authenticity verification of not only software, but also hardware. For example, there have been suggested the risks of not only unauthorized access or DOS (Denial-of-service attack) attacks by unauthorized software like malware, but also the unauthorized access or the DOS attacks by incorporating an unauthorized circuit called "hardware troy" into hardware. Such hardware-based unauthorized acts are sometimes conducted in the process of physical distribution, so that there are some risks even in a standalone environment.

Furthermore, regarding a storage system, interface standards based on PCIe (PCI Express) which is called NVMe (Non-Volatile Memory Express) are generally used and high-speed communications are realized between storage devices and a host. However, the PCIe can directly access a host memory, so that if an unauthorized device into which the hardware troy or the like is incorporated is connected to the host, it becomes possible to make the unauthorized access to the host memory and destroy the memory at the time point where the link is established. Therefore, it has been necessary to judge whether the connected device is a genuine device or not before the link via the PCIe is established.

For example, PTL 1 displays an information processing apparatus that performs verification before an activation signal when activating a system by a trigger signal from a connected device. Since a main communication channel (in-band) is not activated at the time of the verification in the information processing apparatus disclosed by PTL 1, the activation of the system is authenticated by using an auxiliary communication channel (side-band); and if the authentication fails, it is possible to prevent the activation of the unauthorized system by shutting down the system.

CITATION LIST

Patent Literature

PTL 1: Japanese Patent Application Laid-Open (Kokai) Publication No. 2008-299417

SUMMARY OF THE INVENTION

Problems to be Solved by the Invention

However, the technology disclosed in the above-mentioned PTL 1 is an authentication technology against the activation of the unauthorized system and is not a technology that verifies authenticity of the storage device (drive) itself, which is connected to the storage system. Furthermore, regarding the storage system, operations of the system need to continue even if the drive to be mounted is an unauthorized device; and it is not desirable that the system is shut down as in the case of the technology disclosed in PTL 1.

A device called "SED (Self Encrypting Drive)" which is conscious of security also exists among PCIe-based storage devices such as SSDs (Solid State Drives). This is a device which only encrypts saved data, but is not a device which verifies the authenticity of the device itself. The PCIe-based device can directly refer to the host memory at the time point when the link via the PCIe is established as described earlier. So, there are risks of unauthorized access to the host memory and destruction of the memory by the unauthorized device. Therefore, it is important to verify the authenticity of the storage device (drive) and judge whether the connected drive is a genuine device or not before the link via the PCIe is established.

The present invention was devised in consideration of the above-described circumstances and aims at proposing an information processing apparatus, an authenticity verification method, and a program which are capable of judging whether the connected drive is an unauthorized drive or not before it becomes possible for the connected drive to access the memory for the storage controller.

Means to Solve the Problems

In order to solve the above-described problems, there is provided according to the present invention an information processing apparatus capable of connecting a storage device having a plurality of kinds of interfaces, wherein the information processing apparatus includes: a processor that executes programs and controls communication connection; and a built-in memory that retains the programs and data, wherein when the storage device is connected, a plurality of communication channels via the plurality of kinds of interfaces are formed between the storage device and the information processing apparatus; wherein the plurality of communication channels include: a first communication channel via a first interface incapable of accessing the built-in memory even when the communication connection is established; and a second communication channel via a second interface capable of accessing the built-in memory when the communication connection is established; and wherein at a specified timing when the communication connection via the second communication channel is not established, the processor: executes authenticity verification processing for verifying authenticity of the storage device on the basis of information acquired from the storage device by using the first communication channel; and permits establishment of the communication connection via the second communication channel when the authenticity is confirmed by the authenticity verification processing.

Furthermore, in order to solve the above-described problems, there is provided according to the present invention a method for verifying authenticity of a storage device by an information processing apparatus capable of connecting the storage device having a plurality of kinds of interfaces, wherein the information processing apparatus includes: a processor that executes programs and controls communication connection; and a built-in memory that retains the programs and data, wherein when the storage device is connected to the information processing apparatus, a plurality of communication channels via the plurality of kinds of interfaces are formed between the storage device and the information processing apparatus; wherein the plurality of communication channels include: a first communication channel via a first interface incapable of accessing the built-in memory even when the communication connection is established; and a second communication channel via a second interface capable of accessing the built-in memory when the communication connection is established; and wherein at a specified timing when the communication connection via the second communication channel is not established, the processor: executes authenticity verification processing for verifying authenticity of the storage device on the basis of information acquired from the storage device by using the first communication channel; and permits establishment of the communication connection via the second communication channel when the authenticity is confirmed by the authenticity verification processing.

Furthermore, in order to solve the above-described problems, there is provided according to the present invention a program executed by an information processing apparatus capable of connecting a storage device having a plurality of kinds of interfaces, wherein the information processing apparatus includes a processor and a built-in memory, wherein when the storage device is connected to the information processing apparatus, a plurality of communication channels via the plurality of kinds of interfaces are formed between the storage device and the information processing apparatus; wherein the plurality of communication channels include: a first communication channel via a first interface incapable of accessing the built-in memory even when the communication connection is established; and a second communication channel via a second interface capable of accessing the built-in memory when the communication connection is established; and wherein at a specified timing when the communication connection via the second communication channel is not established, the program causes the processor to execute: processing for acquiring specified information from the storage device by using the first communication channel; processing for verifying authenticity of the storage device on the basis of the acquired information; and processing for permitting establishment of the communication connection via the second communication channel when the authenticity is confirmed by the verification.

Advantageous Effects of the Invention

According to the present invention, it is possible to judge whether the connected drive is an unauthorized drive or not before it becomes possible for the connected drive to access the memory for the storage controller.

BRIEF DESCRIPTION OF DRAWINGS

FIG. 6 is a diagram illustrating an example of an expected value table 110;

DESCRIPTION OF EMBODIMENTS

Figure 1:
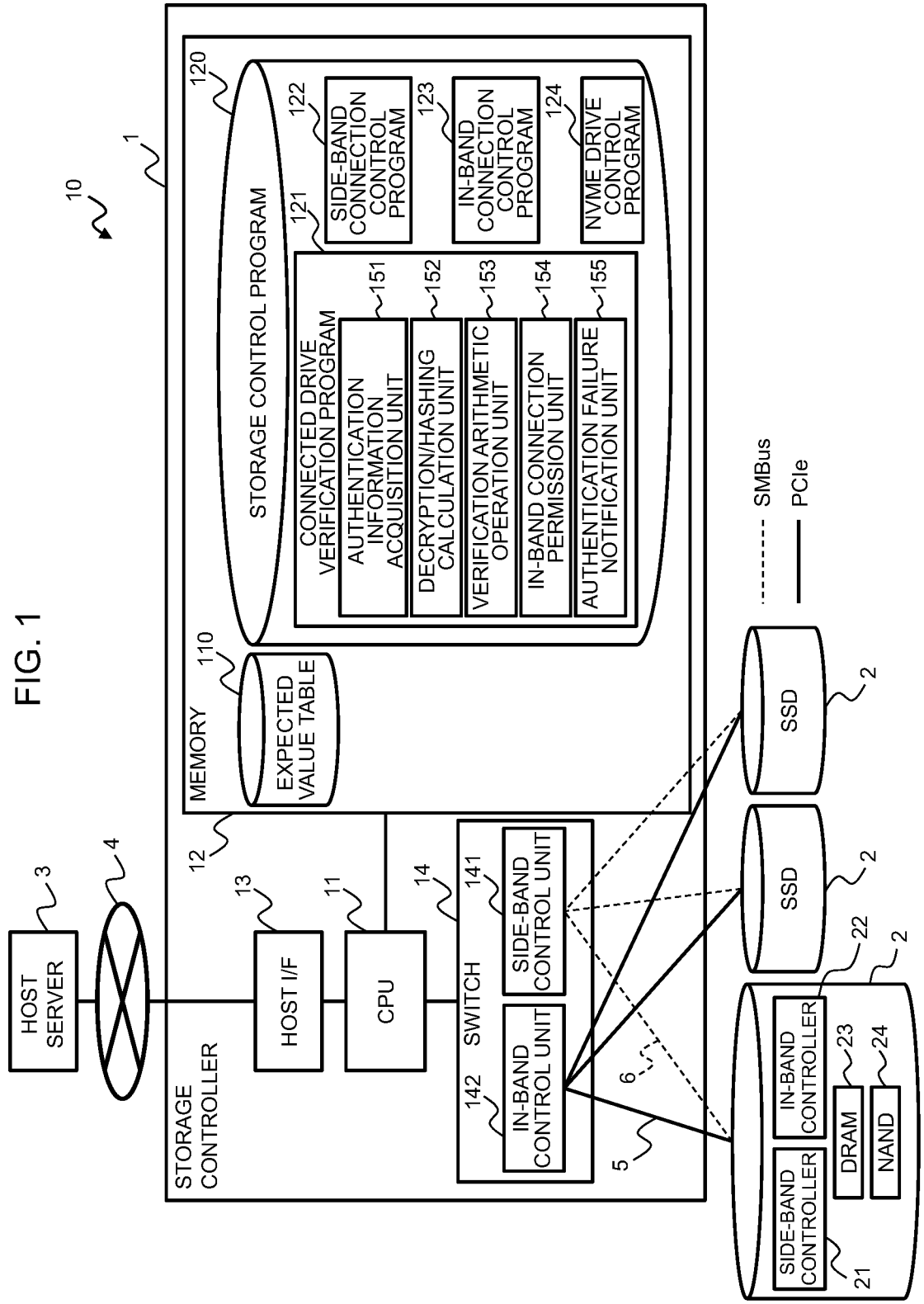
FIG. 1 is a block diagram illustrating a configuration example of an information processing system 10 according to the present invention.

Embodiments of the present invention will be described below in detail with reference to the drawings.

Incidentally, the following description and the drawings are given for illustrative purposes to explain the present invention and some parts are omitted and simplified as necessary in order to clarify the explanation. Also, not all combinations of characteristics explained in embodiments are necessarily indispensable to the means to solve the problems of the invention. The present invention is not limited to the embodiments and any and all applicable examples which conform to the idea of the present invention are included within the technical scope of the present invention. Those skilled in the art can make various additions and changes to the present invention within the scope of the present invention. The present invention can be also implemented in other various forms. Unless particularly limited, each constitutional element may be plural or singular.

Furthermore, the following description sometimes explain processing performed by executing a program(s). The program(s) performs the defined processing by using, for example, a storage resource(s) (for example, a memory) and/or an interface device (for example, a communication port) as necessary as it is executed by at least one or more processors (for example, a CPU(s)), so that a subject of the processing may be recognized as the processor. Similarly, the subject of the processing performed by executing the program may be a controller, apparatus, system, computer, node, storage system, storage apparatus, server, management computer, client, or host which has the processor. The subject (for example, the processor) of the processing performed by executing the program may include a hardware circuit which performs a part or whole of the processing. For example, the subject of the processing performed by executing the program may include a hardware circuit which executes encryption and decryption or compression and extension. The processor operates as a functional unit which implements a specified function by operating in accordance with the program. The apparatus and the system which include the processor are an apparatus and a system which include their functional units.

A program(s) may be installed in an apparatus like a computer from a program source. The program source may be, for example, a program distribution server or a storage medium which can be read by a computer. If the program source is the program distribution server, the program distribution server may include a processor (for example, a CPU) and a storage resource and the storage resource may further store a distribution program and a distribution target program. Then, as the processor for the program distribution server executes the distribution program, the processor for the program distribution server may distribute the distribution target program to other computers. Furthermore, in the following description, two or more programs may be implemented as one program or one program may be implemented as two or more programs.

FIG. 1 is a block diagram illustrating a configuration example of an information processing system 10 according to an embodiment of the present invention. A storage controller 1 illustrated in FIG. 1 is one example of the information processing apparatus according to the present invention. Incidentally, the configuration of the storage controller 1 illustrated in FIG. 1 is the configuration which is required and integrated to implement the respective embodiments described later; and the configuration illustrated in FIG. 1 is not necessarily required depending on the embodiment(s). Specifically speaking, for example, an expected value table 110 is indispensable to a second embodiment, but is not indispensable to other embodiments.

Referring to FIG. 1, the information processing system 10 is configured by including a storage controller 1, an SSD(s) 2, and a host server 3. In the information processing system 10, a storage system which provides the host server 3 with storage by connecting one or more SSD(s) 2 which is/are a storage device(s). The detailed configuration of the storage controller 1 and the SSD(s) 2 will be described later.

The host server 3 is a host apparatus for the storage controller 1 and is connected to the storage controller 1 so that it can communicate with the storage controller 1 via an arbitrary network 4. The SSD(s) 2 is a drive having the NVMe communication protocol and is connected as a storage device for the storage system to the storage controller 1. The SSD(s) 2 and the storage controller 1 are connected via a plurality of kinds of interfaces; and at least an in-band 5 which is a main communication channel and a side-band 6 which is an auxiliary communication channel exist as communication channels via these interfaces.

The in-band 5 is specifically, for example, a PCIe. The PCIe is a point-to-point serial bus interface for realizing high-speed communications and is mainly used for communications between a CPU 11 (which may be replaced with a switch 14) and a device (for example, the SSD(s) 2). Since the in-band 5 is directly linked from the CPU 11 to a memory 12, it becomes possible for the SSD(s) 2 to directly access the CPU 11 and the memory 12 for the storage controller 1 when the connection between the SSD(s) 2 and the storage controller 1 via the in-band 5 (PCIe) is established.

The side-band 6 is specifically, for example, an SMBus (System Management Bus), but may be an I2C (Inter-IC bus). The SMBus is a general-purpose communication bus between devices and realizes communications at a lower speed than that of the PCIe. The SMBus is generally used for the purpose of system management and power source management. The side-band 6 is used for communications between the CPU 11 (which may be replaced with the switch 14) and a device (for example, the SSD(s) 2); however, the major difference between the side-band 6 and the in-band 5 is that the side-band 6 is not directly linked to the memory 12. Therefore, when the communication is performed between the SSD(s) 2 and the storage controller 1 by using the side-band 6 (SMBus) as a pathway, the SSD(s) 2 can directly access the CPU 11 (or the switch 14) for the storage controller 1, but is not permitted to directly access the memory 12 managed by the storage controller 1 (the CPU 11) (and is incapable of accessing the memory).

The storage controller 1 is, for example, a server or a general-purpose computer and includes the CPU 11, the memory 12, a host I/F 13, and the switch 14. Regarding the information processing system 10, a storage system is implemented by connecting one or more storage devices (the SSD(s) 2) to the storage controller 1.

The CPU 11 is a processor which performs the entire control of the storage controller 1, and is, for example, a CPU (Central Processing Unit). The CPU 11 implements various kinds of functions by executing programs stored in the memory 12.

The memory 12 is a built-in memory which stores programs and data, and is specifically, for example, a DRAM (Dynamic Random Access Memory). FIG. 1 illustrates: an expected value table 110 as one example of data stored in the memory 12; and a storage control program 120 as one example of the programs stored in the memory 12.

The expected value table 110: is data used to judge whether the link establishment (linking-up) via the in-band connection should be permitted or not; and retains, for each storage, information indicating whether the linking-up for each authentication pattern is possible or not. The expected value table 110 is stored in the memory 12 in advance.

The storage control program 120 includes various kinds of programs to be executed by the CPU 11 to perform various kinds of control of the drive (the SSD 2) connected to the storage controller 1, that is, a connected drive verification program 121, a side-band connection control program 122, an in-band connection control program 123, and an NVMe drive control program 124.

The connected drive verification program 121: is a program to be executed to verify the drive (the SSD 2) connected to the storage controller 1; and implements an authentication information acquisition unit 151, a decryption/hashing calculation unit 152, a verification arithmetic operation unit 153, an in-band connection permission unit 154, and an authentication failure notification unit 155 by being executed by the CPU 11 or the respective control units in the switch 14 (a side-band control unit 141 and an in-band control unit 142).

The authentication information acquisition unit 151 evokes the side-band connection control program 122 and acquires drive information and authentication information via the side-band 6 (SMBus). The decryption/hashing calculation unit 152 decrypts the encrypted authentication information acquired from the SSD 2 and hashes a product number acquired from the SSD 2. The verification arithmetic operation unit 153 verifies whether the SSD 2 is a proper drive or not by using the information acquired from the SSD 2 via the side-band 6 (SMBus) and delivers the verification result to the in-band connection permission unit 154 or the authentication failure notification unit 155. The in-band connection permission unit 154 evokes the in-band connection control program 123 and establishes a communication connection via the in-band 5. The authentication failure notification unit 155 notifies a user that the device authentication of the SSD 2 has failed (i.e., the SSD 2 was not confirmed as the proper drive).

The side-band connection control program 122 is a program for controlling connection via the side-band 6 (side-band connection). The side-band connection control program 122 executes the communication connection and command issuance of the side-band 6 through the switch 14 in response to requests from other components. The in-band connection control program 123 is a program for controlling connection via the in-band 5 (in-band connection). The in-band connection control program 123 establishes the communication connection (PCIe link) of the in-band 5 through the switch 14 in response to requests from other components. The NVMe drive control program 124 is a program for controlling an NVMe drive (SSD 2) connected to the storage controller 1. The NVMe drive control program 124 issues a read command(s) and a write command(s) to the SSD 2, which is the NVMe drive, in response to requests from the host server 3 and stores or reads data.

The host I/F 13 is an interface which accepts access from the host server 3.

The switch 14 is, for example, a PCIe switch and includes a side-band control unit 141 and an in-band control unit 142. The side-band control unit 141: is a controller that performs control of the NVMe drive (the SSD 2), which is connected to the storage controller 1, via the side-band (SMBus) connection; and uses the side-band 6 as a communication channel and transmits/receives a control signal to/from a side-band controller 21 by executing the side-band connection control program 122. The in-band control unit 142: is a controller that performs control of the NVMe drive (the SSD 2), which is connected to the storage controller 1, via the in-band (PCIe) connection; and uses the in-band 5 as a communication channel and transmits/receives the control signal to/from an in-band controller 22 by executing the in-band connection control program 123.

Incidentally, the storage controller 1 illustrated in FIG. 1 may be configured, without including the switch 14, so that the CPU 11 controls the connected NVMe drive (the SSD 2). In this case, a control unit which controls the side-band communication and a control unit which controls the in-band communication exist within the CPU 11. Furthermore, for the purpose of simplification of the following description, the CPU 11 or the switch 14 which operates by executing the programs in the memory 12 may be sometimes collectively referred to as "CTL" as the subject of the control or the processing execution in the storage controller 1.

Furthermore, although the illustration in the drawing is omitted, the storage controller 1 has two kinds of power sources (a 3.3V power source and a 12V power source) as power sources for supplying electric power to the SSD(s) 2. Of these power sources, the 12V power source is required to perform communications via the in-band 5 because the PCIe has larger electric power consumption than that of the SMBus. On the other hand, the SMBus has small electric power consumption, so that the communication via the side-band 6 can be performed by using only the 3.3V power source.

The SSD 2 is the NVMe drive connected to the storage controller 1 and is, for example, an NVMe SSD. The SSD 2 includes the side-band controller 21, the in-band controller 22, a DRAM 23, and an NAND 24. Two interfaces which are a PCIe I/F and an SMBus I/F exist in the NVMe drive. The PCIe I/F becomes accessible to the memory 12 for the storage controller 1 immediately after the linking-up, while the SMBus I/F cannot access the memory 12 for the storage controller 1 even after the linking-up.

The side-band controller 21 retains VPD (Vital Product Data) and authentication information of the SSD 2 and transfers the information via the side-band 6 in response to a request from a host (the storage controller 1). The in-band controller 22 is activated via the PCIe, transfers data stored in the NAND 24 inside the SSD 2 to the host (the storage controller 1) and stores data, which is received from the host, in the NAND 24. Incidentally, for the purpose of simplification of the following description, the side-band controller 21 and the in-band controller 22 may be sometimes collectively referred to as a "memory CTL" as the subject of the control or the processing execution in the SSD 2.

The DRAM 23 is a DRAM in which a microprogram for controlling the SSD 2 is stored. The NAND 24 is an NAND-type flash memory which stores user data in accordance with a command from the storage controller 1.

Incidentally, FIG. 1 shows the SSDs 2 which are NVMe SSDs as an example of storage devices (drives) connected to the storage controller 1; however, the storage device(s) in this embodiment is not limited to this example and may have at least two kinds of communication interfaces and one of these interfaces may be according to interface specifications (for example, SMBus or I2C) so that it cannot access the memory 12 for the storage controller 1 even after the linking-up. Specifically, the storage device(s) according to this embodiment may be any one of an NVMe SSD, an NVMe SCM (Storage Class Memory), or an NVMe HDD.

Each embodiment of the present invention will be explained below in detail by using the configuration of the information processing system 10 illustrated in FIG. 1. Incidentally, in each embodiment below, an explanation will be provided by assuming that the storage controller 1 includes the switch 14 having the side-band control unit 141 and the in-band control unit 142 as illustrated in FIG. 1.

(1) First Embodiment

An information processing apparatus (storage controller 1) according to a first embodiment uses drive information possessed by a connected drive (SSD 2) when verifying the authenticity of the drive.

Figure 2:
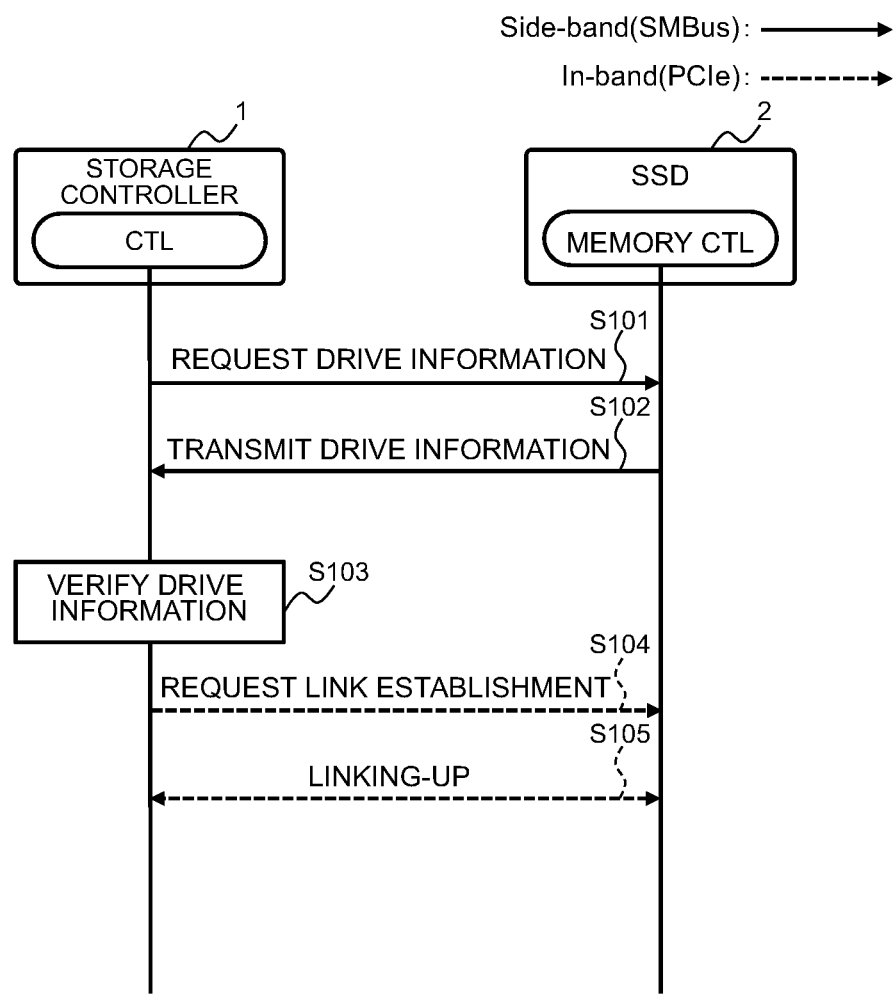
FIG. 2 is a ladder chart illustrating a processing procedure example of processing executed when connecting a drive according to a first embodiment.

FIG. 2 is a ladder chart illustrating a processing procedure example of processing executed when connecting the drive according to the first embodiment. Incidentally, FIG. 2 illustrates that a processing subject in the storage controller 1 is CTL and a processing subject in the SSD 2 is a memory CTL; however, the communication via the side-band 6 (SMBus) is controlled by the side-band control unit 141 and the side-band controller 21 and the communication via the in-band 5 (PCIe) is controlled by the in-band control unit 142 and the in-band controller 22. This also applies to ladder charts in other embodiments described later.

The processing in FIG. 2 is started when the SSD 2 is physically connected to (or mounted in) the storage controller 1. The connection via the in-band 5 (PCIe) is not established at this point in time and the communication between the CTL for the storage controller 1 and the memory CTL for the SSD 2 is performed via the side-band 6 (SMBus).

Referring to FIG. 2, the CTL for the storage controller 1 firstly requests the connected SSD 2 to provide the drive information via the side-band 6 (step S101).

Next, the memory CTL for the SSD 2 transmits the drive information of its own drive via the side-band to the storage controller 1 in response to the request in step S101 (step S102). This drive information is a specified type of information of its own drive and is, for example, VPD (Vital Product Data). The VPD is important product data of the drive and includes information about structures and settings of hardware or software. Incidentally, in step S102, at least the specified type of data which is required for verification processing in step S103 described later, among the various kinds of information included in the VPD, only has to be transmitted. Specifically speaking, this specified type of data may be, for example, data indicating a model name or a model number of the drive, or data of a specified portion indicating a pattern which is common with proper (genuine) drives in the model name or the model number of the drive. The explanation will continue by referring to the data of the specified portion of the model number of the drive as "data of a specified item(s)" below.

Next, the CTL verifies whether the SSD 2 is a proper drive or not by using the drive information received in step S102 (step S103). If it is determined in step S103 that the SSD 2 is not the proper drive, the processing in step S104 and subsequent steps will not be performed.

If it is determined in step S103 that the SSD 2 is the proper drive, the establishment of the connection via the in-band 5 (PCIe) is permitted and, therefore, the CTL requests the in-band controller 22 for the SSD 2 to establish a link via the in-band 5 (step S104).

Then, the in-band controller 22 performs the linking-up via the in-band 5 in response to the request in step S104 (step S105). Consequently, it becomes possible for the in-band controller 22 for the SSD 2 to directly access the memory 12 for the storage controller 1.

Incidentally, in FIG. 2, the drive information is acquired in a format including the data of the specified item(s) which is used for the verification in steps S101 and S102; however, the processing may proceed to separately acquire the data of the specified item(s) (for example, a portion of the model number) to be used for the verification after acquiring the drive information of the SSD 2.

Figure 3:
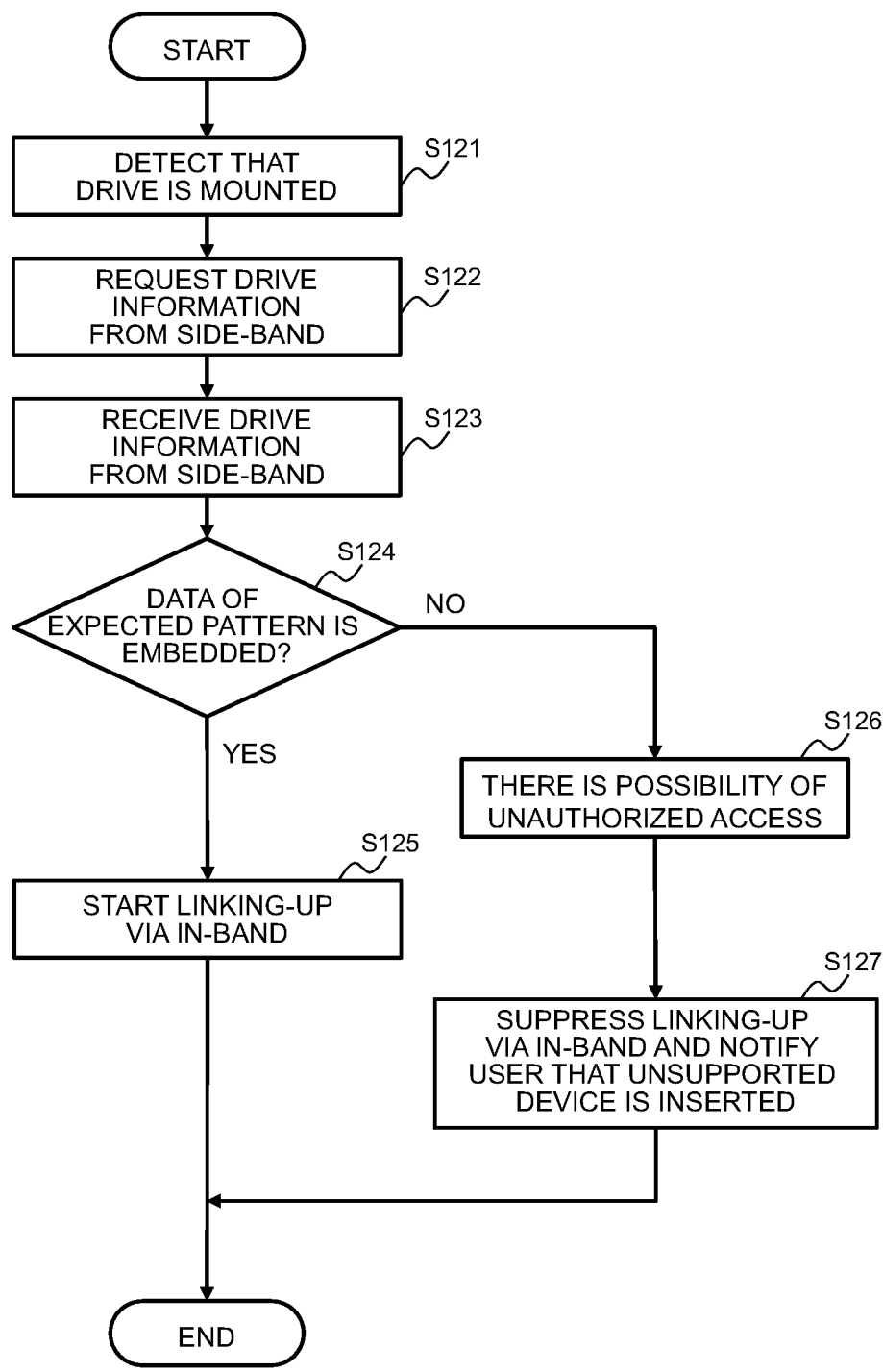
FIG. 3 is a flowchart illustrating a processing procedure example of authenticity verification processing according to the first embodiment.

FIG. 3 is a flowchart illustrating a processing procedure example of authenticity verification processing according to the first embodiment. FIG. 3 illustrates a processing procedure of processing executed by the CTL for the storage controller 1 (the switch 14 or the CPU 11) among the processing indicated in the ladder chart in FIG. 2 and the execution subject of the CTL will be made more clearer and be explained in detail.

Referring to FIG. 3, once the side-band control unit 141 detects the connection of the SSD 2 (step S121), the authentication information acquisition unit 151 requests the SSD 2 to provide the drive information by using the side-band 6 (step S122) and receives the drive information of the SSD 2 via the side-band 6 from the side-band controller 21 (step S123).

Next, the verification arithmetic operation unit 153 verifies whether or not data of an expected pattern (that is, data indicating a pattern of the model number which is in common with proper drives) is embedded in the drive information received in step S123 (step S124). The "expected pattern" herein used is retained in the memory 12 in advance by, for example, being set in the expected value table 110.

If it is confirmed in step S124 that the data of the expected pattern is embedded (YES in step S124), the verification arithmetic operation unit 153 determines that the drive (the SSD 2) detected in step S121 is a proper drive. When this happens, the in-band connection permission unit 154 executes the in-band connection control program 123 and requests the in-band controller 22 for the SSD 2 to establish the link via the in-band 5 and its response processing is executed, thereby staring the linking-up via the in-band 5 (step S125).

On the other hand, if it is not confirmed in step S124 that the data of the expected pattern is embedded (NO in step S124), the verification arithmetic operation unit 153 determines that the drive (the SSD 2) detected in step S121 is not the proper drive, but may possibly be an unauthorized access (step S126). In this case, the in-band connection permission unit 154 executes the in-band connection control program 123 and suppresses the linking-up via the in-band 5 and the authentication failure notification unit 155 notifies the user that an unsupported device is inserted (step S127), thereby terminating the processing.

If the information processing apparatus (the storage controller 1) according to the first embodiment is employed as described above, the authenticity of the drive is judged on the basis of the drive information which is specific to the drive by using the side-band 6 (SMBus) before it becomes possible for the connected drive (the SSD 2) to access the memory 12 for the storage controller 1; and only if the drive is a proper drive, the linking-up of the communication channel (the in-band 5 (PCIe)) which can directly access the memory 12 can be permitted.

(2) Second Embodiment

An information processing apparatus (storage controller 1) according to a second embodiment uses the authentication information written to a connected drive (SSD 2) when verifying the authenticity of the drive.

Figure 4:
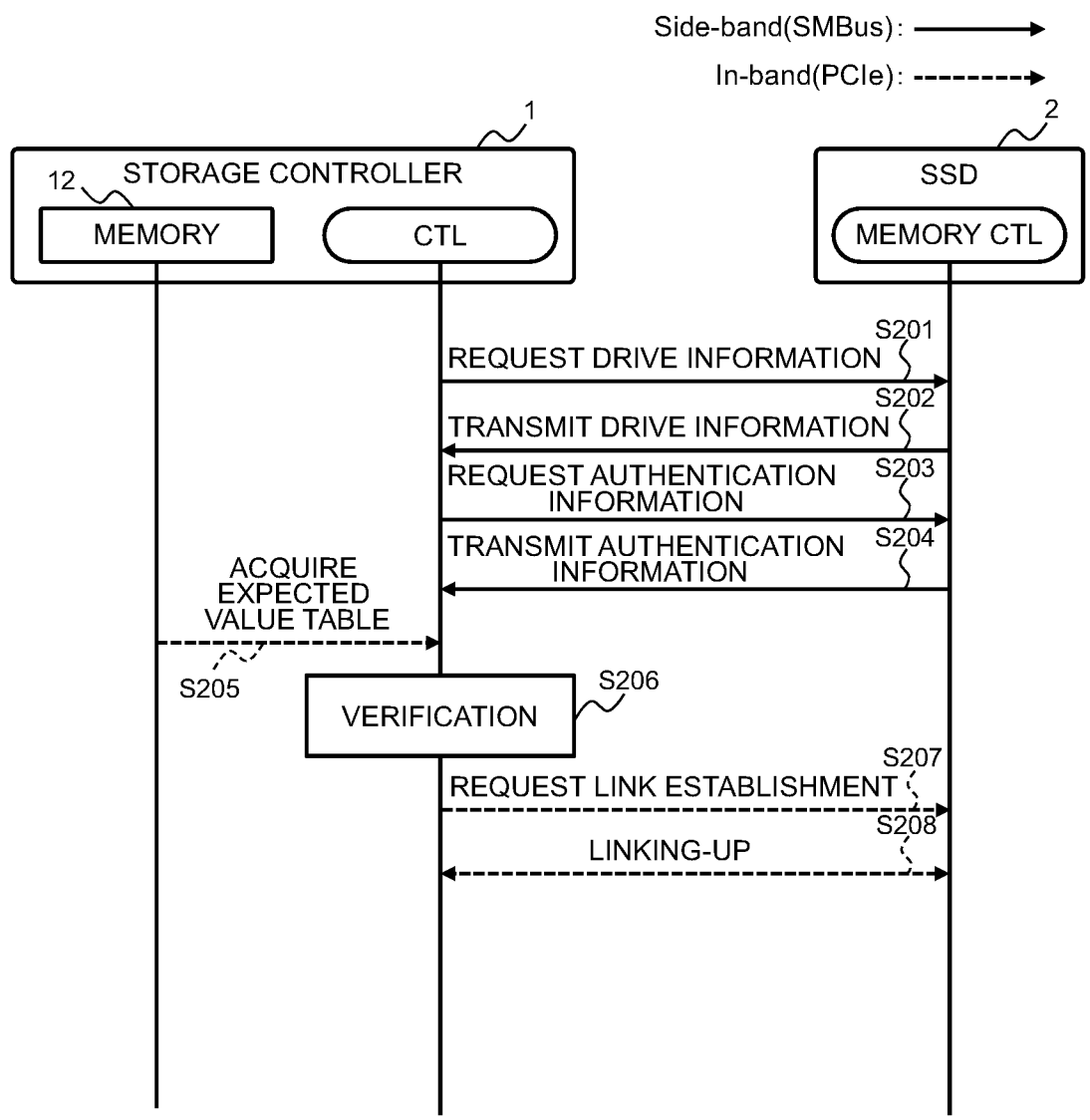
FIG. 4 is a ladder chart illustrating a processing procedure example of processing executed when connecting a drive according to a second embodiment.

FIG. 4 is a ladder chart illustrating a processing procedure example of processing executed when connecting the drive according to the second embodiment. The processing in FIG. 4 is started when the SSD 2 is physically connected to (or mounted in) the storage controller 1. The connection via the in-band 5 (PCIe) is not established at this point in time and the communication between the CTL for the storage controller 1 and the memory CTL for the SSD 2 is performed via the side-band 6 (SMBus).

Referring to FIG. 4, the CTL for the storage controller 1 firstly requests the connected SSD 2 to provide the drive information via the side-band 6 (step S201). Then, the memory CTL for the SSD 2 transmits the drive information of its own drive to the storage controller 1 in response to the request in step S201 (step S202). Incidentally, the drive information is, for example, VPD.

Next, the CTL requests the connected SSD 2 to provide the authentication information stored in that drive (step S203). Then, the memory CTL transmits the authentication information, which is retained by the side-band controller 21, to the storage controller 1 in response to the request in step S203 (step S204).

Under this circumstance, the authentication information retained by the side-band controller 21 is written at a specified timing during a time period from the manufacturing stage of the drive until it is delivered to an end user. Specifically, for example, a manufacturer who sells the SSD 2 as a storage drive writes the specified authentication information, which indicates that the relevant drive is a proper drive, during assembling of the device and in an inspection process, etc. The above-described authentication information may be prepared in a plurality of forms based on a model type (type) or the like of the drive. Then, the authentication information which indicates that the relevant drive is a proper drive is also stored in the expected value table 110 as illustrated in FIG. 6 described later. Incidentally, the authentication information may be, for example, information like a password which is integrally defined for each manufacturing vendor of the drive or may be written by the manufacturing vendor.

Next, the CTL for the storage controller 1 acquires the expected value table 110 stored in the memory 12 (step S205). Then, the CTL verifies whether the SSD 2 is a proper device or not by comparing the authentication information received in step S204 with the expected value table 110 acquired in step S205 (step S206). If it is determined in step S206 that the SSD 2 is not the proper drive, the processing in step S207 and subsequent steps will not be performed.

If it is determined in step S206 that the SSD 2 is the proper drive, the establishment of the connection via the in-band 5 (PCIe) is permitted and, therefore, the CTL requests the in-band controller 22 for the SSD 2 to establish a link via the in-band 5 (step S207). Then, the in-band controller 22 performs the linking-up via the in-band 5 in response to the request in step S207 (step S208). Consequently, it becomes possible for the in-band controller 22 for the SSD 2 to directly access the memory 12 for the storage controller 1.

Incidentally, in FIG. 4, the processing for acquiring the drive information in steps S201 and S202 and the processing for acquiring the authentication information in steps S203 and S204 are executed separately; however, the authentication information may be acquired together with the drive information. Furthermore, the timing to execute the processing in step S205 for acquiring the expected value table 110 may be any timing in and before step S206.

Figure 5:
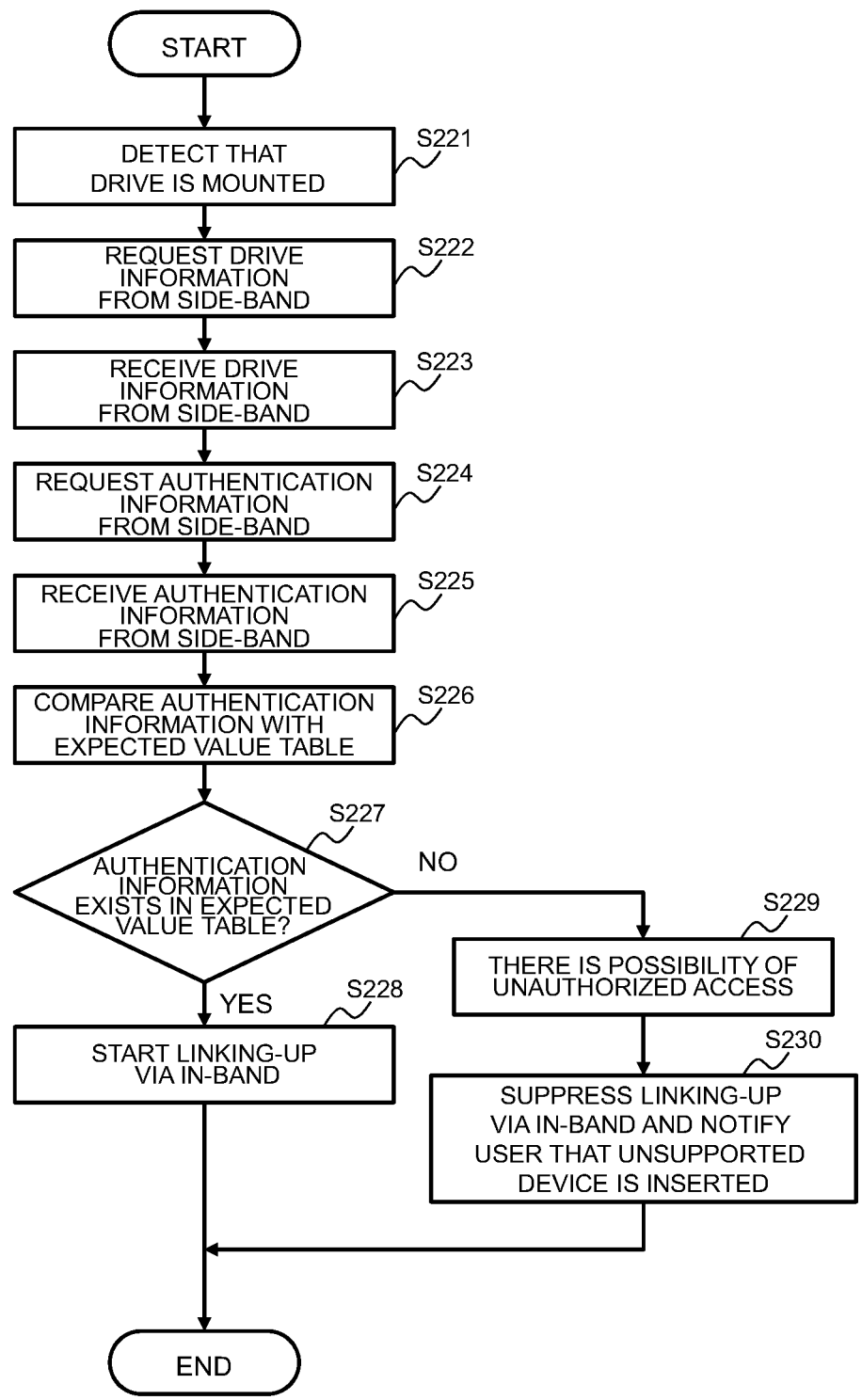
FIG. 5 is a flowchart illustrating a processing procedure example of authenticity verification processing according to the second embodiment.

FIG. 5 is a flowchart illustrating a processing procedure example of authenticity verification processing according to the second embodiment. FIG. 5 illustrates a processing procedure of processing executed by the CTL for the storage controller 1 (the switch 14 or the CPU 11) among the processing indicated in the ladder chart in FIG. 4 and the execution subject of the CTL will be made more clearer and be explained in detail.

Referring to FIG. 5, when the side-band control unit 141 detects the connection of the SSD 2 (step S221), the authentication information acquisition unit 151 requests the SSD 2 to provide the drive information by using the side-band 6 (step S222) and receives the drive information of the SSD 2 from the side-band controller 21 via the side-band 6 (step S223).

Next, the authentication information acquisition unit 151 requests the SSD 2 to provide the authentication information (step S224) and receives the authentication information of the SSD 2 from the side-band controller 21 (step S225). Furthermore, the authentication information acquisition unit 151 acquires the expected value table 110 from the memory 12.

Then, the verification arithmetic operation unit 153 compares the expected value table 110 with the authentication information received in step S225 (step S226) and thereby judges whether the authentication information is described in the expected value table 110 or not (step S227).

If the matching authentication information is described in the expected value table 110 in step S227 (YES in step S227), the verification arithmetic operation unit 153 determines that the drive (the SSD 2) detected in step S221 is a proper drive. When this happens, the in-band connection permission unit 154 executes the in-band connection control program 123 and requests the in-band controller 22 for the SSD 2 to establish a link via the in-band 5 and its response processing is performed, thereby starting the linking-up via the in-band 5 (step S228).

On the other hand, if the matching authentication information is not described in the expected value table 110 in step S227 (NO in step S227), the verification arithmetic operation unit 153 determines that determines that the drive (the SSD 2) detected in step S221 is not the proper drive, but may possibly be an unauthorized access (step S229). In this case, the in-band connection permission unit 154 executes the in-band connection control program 123 and suppresses the linking-up via the in-band 5 and the authentication failure notification unit 155 notifies the user that an unsupported device is inserted (step S127), thereby terminating the processing.

FIG. 6 is a diagram illustrating an example of the expected value table 110. The expected value table 110 illustrated in FIG. 6 includes the following data items: a storage number 1101 indicating an identifier of a drive type; an authentication pattern 1102 indicating the authentication information which can be stored in the drive; and permitted/unpermitted 1103 indicating the judgment of whether the connection via the in-band is permitted or unpermitted.

The judgment of step S227 will be specifically explained by using the expected value table 110 in FIG. 6. For example, if the target SSD 2 is a drive of the type "1" and the authentication information received from the SSD 2 is either one of "A," "B," and "C," the link (connection) via the in-band is permitted as set in the permitted/unpermitted 1103 of the expected value table 110. In other words, it is judged as YES in step S227 and the processing in step S228 is executed. On the other hand, if the authentication information received from the SSD 2 is other than "A," "B," or "C," it is determined that the SSD 2 may possibly be an unauthorized device and the link (connection) via the in-band is not permitted. In other words, it is judged as NO in step S227 and the processing in steps S229 and S230 is executed.

If the information processing apparatus (the storage controller 1) according to the second embodiment is employed as described above, the authenticity of the drive is judged on the basis of the authentication information, which is written until the drive reaches the end user, by using the side-band 6 (SMBus) before it becomes possible for the connected drive (the SSD 2) to access the memory 12 for the storage controller 1; and only if the drive is a proper drive, the linking-up of the communication channel (the in-band 5 (PCIe)) which can directly access the memory 12 can be permitted.

(3) Third Embodiment

An information processing apparatus (storage controller 1) according to a third embodiment uses encrypted authentication information, which is written to a connected drive (SSD 2), when verifying the authenticity of the drive.

Figure 7:
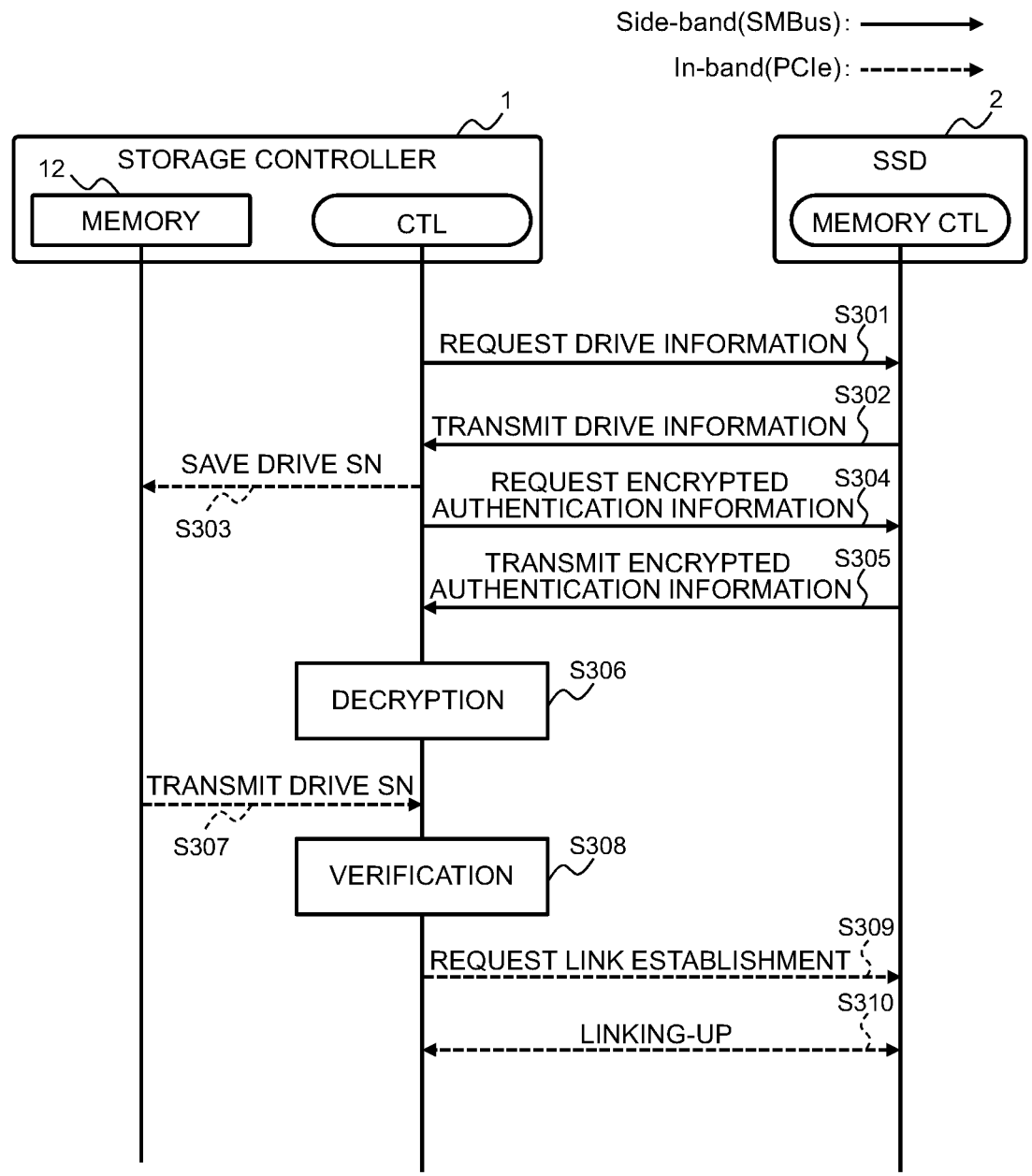
FIG. 7 is a ladder chart illustrating a processing procedure example of processing executed when connecting a drive according to a third embodiment.

FIG. 7 is a ladder chart illustrating a processing procedure example of processing executed when connecting the drive according to the third embodiment. The processing in FIG. 7 is started when the SSD 2 is physically connected to (or mounted in) the storage controller 1. The connection via the in-band 5 (PCIe) is not established at this point in time and the communication between the CTL for the storage controller 1 and the memory CTL for the SSD 2 is performed via the side-band 6 (SMBus).

Referring to FIG. 7, the CTL for the storage controller 1 firstly requests the connected SSD 2 to provide the drive information via the side-band 6 (step S301). Then, the memory CTL for the SSD 2 transmits the drive information of its own drive via the side-band 6 to the storage controller 1 in response to the request in step S301 (step S302). Incidentally, the drive information is, for example, VPD; and in this example, it is assumed that this VPD includes a product number (SN) which is assigned as a unique identification number when the relevant drive is manufactured.

Next, the CTL for the storage controller 1 saves the product number (the drive SN) of the SSD 2, which is included in the drive information received in step S302, in the memory 12 (step S303).

Subsequently, the CTL requests the connected the SSD 2 to provide the "encrypted authentication information" stored in that drive (step S304). This encrypted authentication information is the encrypted information which is retained by, for example, the side-band controller 21 and is written at a specified timing during a time period from the manufacturing stage of the drive until it is delivered to an end user. Specifically, for example, it is assumed that it is information (encrypted SN) obtained by a manufacturer who sells the SSD 2 as a storage drive by encrypting the product number of the drive (SSD 2) by using a secret key during assembling of the device or an inspection process. So, the memory CTL for the SSD 2 which has received the request in step S304 transmits the encrypted authentication information (encrypted SN), which is retained by the side-band controller 21, to the storage controller 1 (step S305).

Next, the CTL for the storage controller 1 acquires the drive SN of the SSD 2 by decrypting the encrypted authentication information, which was received in step S305, by using a public key (step S306). The public key may be retained by the memory 12 for the storage controller 1 or may be acquired from a public key infrastructure (PKI). Furthermore, the CTL acquires the drive SN, which was saved in step S303, from the memory 12 (step S307).

The, the CTL verifies whether the SSD 2 is a proper drive or not by comparing the drive SN decrypted in step S306 with the drive SN acquired in step S307. If it is determined in step S308 that the SSD 2 is not the proper drive, the processing in step S309 and subsequent steps will not be performed.

If it is determined in step S308 that the SSD 2 is the proper drive, the establishment of the connection via the in-band 5 (PCIe) is permitted and, therefore, the CTL requests the in-band controller 22 for the SSD 2 to establish a link via the in-band 5 (step S309). Then, the in-band controller 22 performs the linking-up via the in-band 5 in response to the request in step S309 (step S310). Consequently, it becomes possible for the in-band controller 22 for the SSD 2 to directly access the memory 12 for the storage controller 1.

Incidentally, in this embodiment, the key may be updated regularly as a countermeasure against the risk of leakage of the secret key to a third party. Also, a common key may be used instead of the public key. Furthermore, the verification processing in step S308 may be implemented by the switch 14; and when this happens, if it is determined that the SSD 2 is the proper drive, a PCIe path may be connected between the switch 14 and the CPU 11 or between the SSD 2 and the switch 14.

Figure 8:
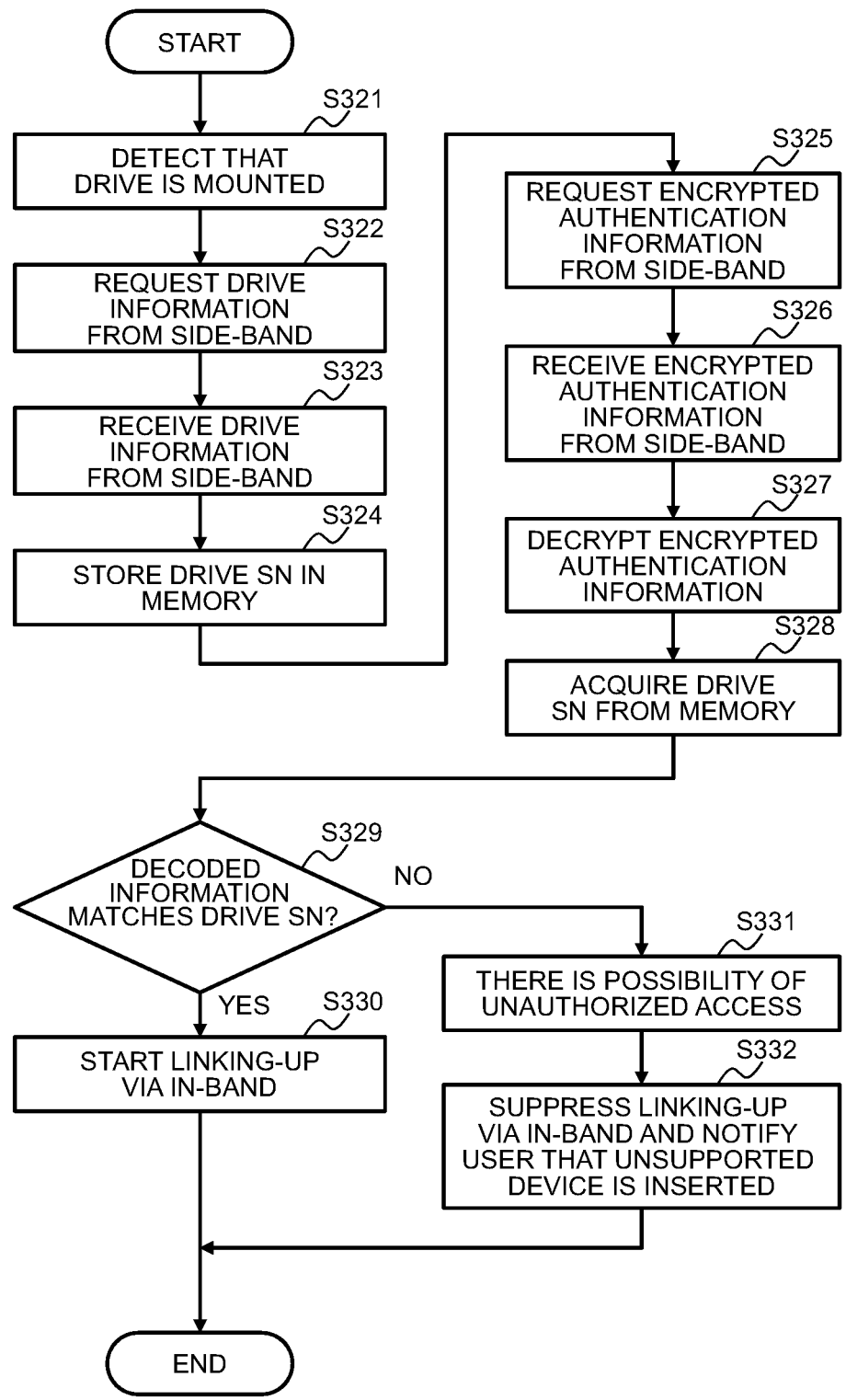
FIG. 8 is a flowchart illustrating a processing procedure example of authenticity verification processing according to the third embodiment.

FIG. 8 is a flowchart illustrating a processing procedure example of authenticity verification processing according to the third embodiment. FIG. 8 illustrates a processing procedure of processing executed by the CTL for the storage controller 1 (the switch 14 or the CPU 11) among the processing indicated in the ladder chart in FIG. 7 and the execution subject of the CTL will be made more clearer and be explained in detail.

Referring to FIG. 8, once the side-band control unit 141 detects the connection of the SSD 2 (step S321), the authentication information acquisition unit 151 requests the SSD 2 to provide the drive information by using the side-band 6 (step S322) and receives the drive information of the SSD 2 from the side-band controller 21 via the side-band 6 (step S323). Then, the authentication information acquisition unit 151 saves the product number (the drive SN) of the SSD 2, which is included in the received drive information, in the memory 12 (step S324).

Next, the authentication information acquisition unit 151 requests the SSD 2 to provide the encrypted authentication information (step S325) and receives the encrypted authentication information of the SSD 2 from the side-band controller 21 (step S326). The encrypted authentication information is the information obtained by encrypting the product number of the SSD 2 by using the secret key (the encrypted SN) as explained with reference to FIG. 7.

Subsequently, the decryption/hashing calculation unit 152 decrypts the encrypted authentication information, which was received in step S326, by using the public key (step S327).

Then, the verification arithmetic operation unit 153 acquires the drive SN, which was saved in step S324, from the memory 12 (step S328) and judges whether the acquired drive SN matches the information decrypted in step S327 or not (step S329).

If the decrypted information (the decryption result of the encrypted SN) matches the product number (the drive SN) included in the drive information in step S329 (YES in step S329), the verification arithmetic operation unit 153 determines that the drive (SSD 2) detected in step S321 is a proper drive. When this happens, the in-band connection permission unit 154 executes the in-band connection control program 123 and requests the in-band controller 22 for the SSD 2 to establish a link via the in-band 5 and its response processing is performed, thereby starting the linking-up via the in-band 5 (step S330).

On the other hand, if the decrypted information (the decryption result of the encrypted SN) does not match the product number (the drive SN) included in the drive information in step S329 (NO in step S329), the verification arithmetic operation unit 153 determines that the drive (the SSD 2) detected in step S321 is not the proper drive and may possibly be an unauthorized access (step S331). In this case, the in-band connection permission unit 154 executes the in-band connection control program 123 and suppresses the linking-up via the in-band 5 and the authentication failure notification unit 155 notifies the user that an unsupported device is inserted (step S332), thereby terminating the processing.

If the information processing apparatus (the storage controller 1) according to the third embodiment is employed as described above, the authenticity of the drive is judged on the basis of the encrypted drive information (for example, the encrypted information of the product number), which is written until the drive is delivered to the end user, by using the side-band 6 (SMBus) before it becomes possible for the connected drive (the SSD 2) to access the memory 12 for the storage controller 1; and only if the drive is a proper drive, the linking-up of the communication channel (the in-band 5 (PCIe)) which can directly access the memory 12 can be permitted. Incidentally, the encrypted product number (SN) of the drive is used as the authentication information in the above explanation; however, this embodiment is not limited to this example and specific information of the drive other than the product number may be encrypted and used as the authentication information.

(4) Fourth Embodiment

An information processing apparatus (storage controller 1) according to a fourth embodiment uses hashed authentication information, which is written to a connected drive (SSD 2), when verifying the authenticity of the drive.

Figure 9:
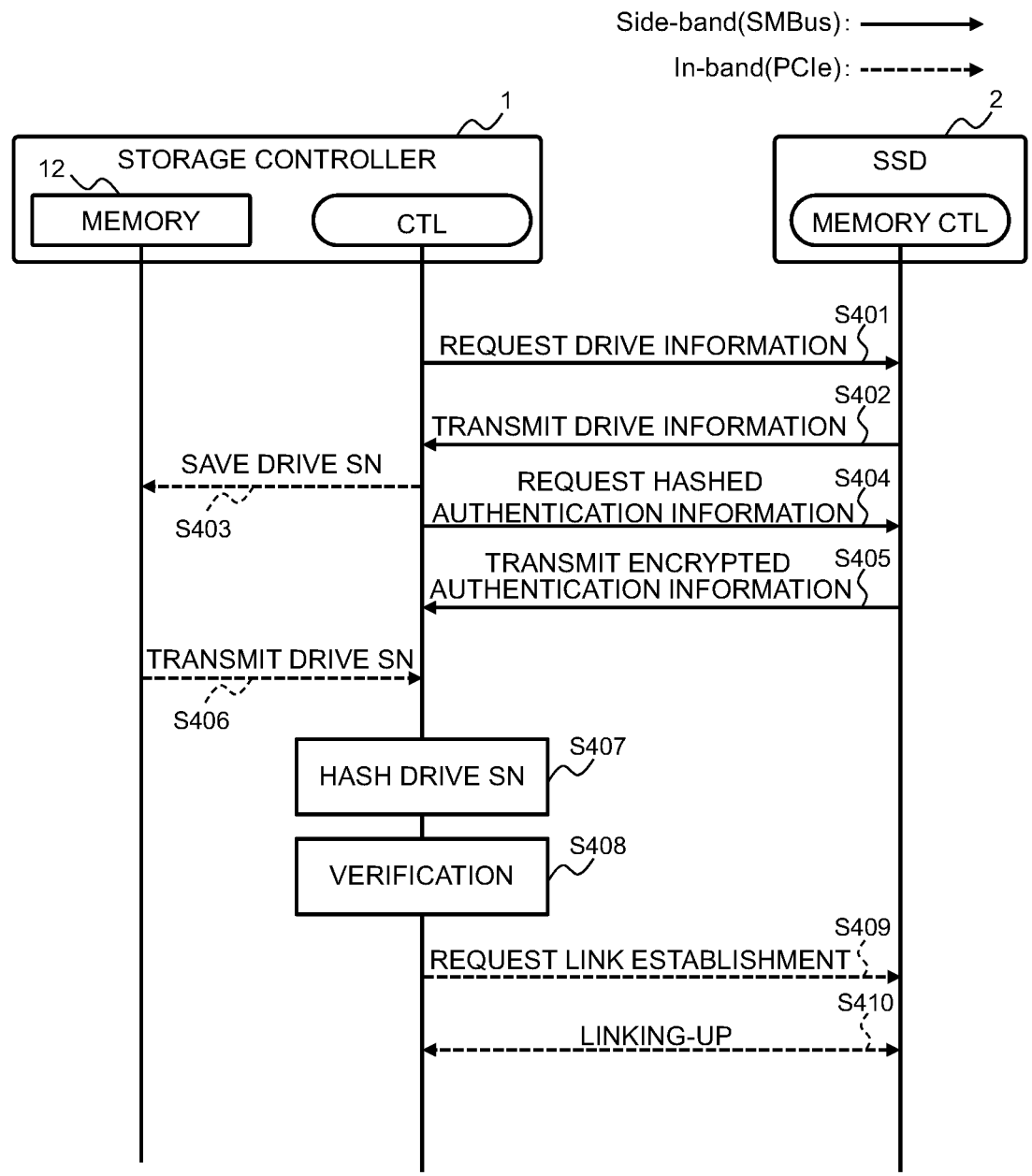
FIG. 9 is a ladder chart illustrating a processing procedure example of processing executed when connecting a drive according to a fourth embodiment.

FIG. 9 is a ladder chart illustrating a processing procedure example of processing executed when connecting a drive according to the fourth embodiment. The processing in FIG. 9 is started when the SSD 2 is physically connected to (or mounted in) the storage controller 1. In the explanation of FIG. 9, a detailed explanation about processing which is in common with the processing in FIG. 7 illustrated in the third embodiment is omitted.

Processing of steps S401 to S403 in FIG. 9 is similar to the processing of steps S301 to S303 in FIG. 7.

Next, the CTL for the storage controller 1 requests the connected SSD 2 to provide the "hashed authentication information" which is stored in the relevant drive (step S404). This hashed authentication information is retained by, for example, the side-band controller 21 and is written at a specified timing during a time period from the manufacturing stage of the drive until it is delivered to an end user. Specifically, the hashed authentication information is information obtained by hashing the product number (SN) of the drive and is written by, for example, a manufacturer who sells the SSD 2 as a storage drive during assembling of the device or an inspection process. So, the memory CTL for the SSD 2 which has received the request in step S404 transmits the hashed authentication information (a hash value of the drive SN), which is retained by the side-band controller 21, to the storage controller 1 (step S405).

Next, the CTL for the storage controller 1 acquires the drive SN, which was saved in step S403, from the memory 12 (step S406).

Next, the CTL hashes the drive SN, which is a plaintext acquired in step S406, by means of a hash function (step S407). Then, the CTL verifies whether the SSD 2 is a proper drive or not by comparing the hashed authentication information (the hash value of the drive SN) received in step S405 with the hash value of the drive SN which was hashed in step S407 (step S408). If it is determined in step S408 that the SSD 2 is not the proper drive, the processing in step S409 and subsequent steps will not be performed.

If it is determined in step S408 that the SSD 2 is the proper drive, the link establishment via the in-band 5 is requested and the linking-up is performed in the same manner as the processing in steps S309 and S310 in FIG. 7 (steps S409 and S410). Consequently, it becomes possible for the in-band controller 22 for the SSD 2 to directly access the memory 12 for the storage controller 1.

Figure 10:
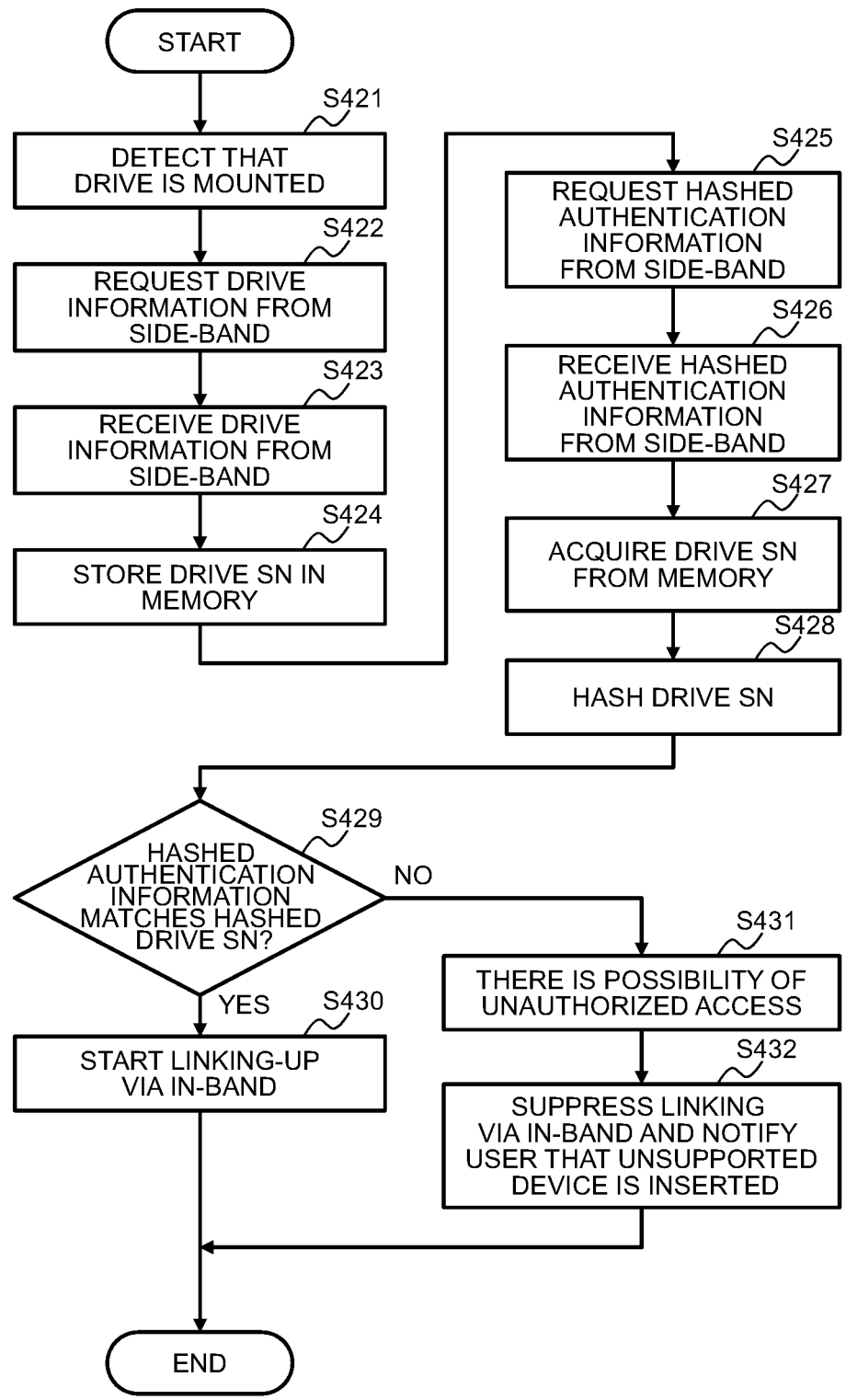
FIG. 10 is a flowchart illustrating a processing procedure example of authenticity verification processing according to the fourth embodiment.

FIG. 10 is a flowchart illustrating a processing procedure example of authenticity verification processing according to the fourth embodiment. FIG. 10 illustrates a processing procedure of processing executed by the CTL for the storage controller 1 (the switch 14 or the CPU 11) among the processing indicated in the ladder chart in FIG. 9 and the execution subject of the CTL will be made more clearer and be explained in detail. Incidentally, in the explanation of FIG. 10, a detailed explanation about processing which is in common with the processing in FIG. 8 illustrated in the third embodiment is omitted.

Processing of steps S421 to S424 in FIG. 10 is similar to the processing of steps S321 to S324 in FIG. 8.

Next, the authentication information acquisition unit 151 requests the SSD 2 to provide the hashed authentication information (step S425) and receives the hashed authentication information of the SSD 2 from the side-band controller 21 (step S426). The hashed authentication information is information which is obtained by hashing the product number of the SSD 2 and is written to the SSD 2 in advance, as explained with reference to FIG. 9.

Subsequently, the decryption/hashing calculation unit 152 acquires the product number (the drive SN which is a plaintext) of the SSD 2, which was saved in step S424, from the memory 12 (step S427) and hashes the acquired product number by means of the hash function (step S428).

Then, the verification arithmetic operation unit 153 judges whether or not the hashed authentication information (the hash value of the drive SN) received in step S426 matches the hash value of the drive SN which was hashed in step S428 (step S429).

If the hashed authentication information (the hash value of SN which is written to the drive) matches the hash value obtained by hashing the drive SN (the value obtained by hashing the product number of the drive information) in step S429 (YES in step S429), the verification arithmetic operation unit 153 determines that the drive (the SSD 2) detected in step S421 is the proper drive. When this happens, the in-band connection permission unit 154 executes the in-band connection control program 123 and requests the in-band controller 22 for the SSD 2 to establish the link via the in-band 5 and its response processing is performed, thereby starting the linking-up via the in-band 5 (step S430).

On the other hand, if the hashed authentication information (the hash value of SN which is written to the drive) does not match the hash value obtained by hashing the drive SN (the value obtained by hashing the product number of the drive information) in step S429 (NO in step S429), the verification arithmetic operation unit 153 determines that the drive (the SSD 2) detected in step S321 is not the proper drive, but may possibly be an unauthorized access (step S331). In this case, the in-band connection permission unit 154 executes the in-band connection control program 123 and suppresses the linking-up via the in-band 5 and the authentication failure notification unit 155 notifies the user that an unsupported device is inserted (step S332), thereby terminating the processing.

If the information processing apparatus (the storage controller 1) according to the fourth embodiment is employed as described above, the authenticity of the drive is judged on the basis of the hashed authentication information, which was written until the drive is delivered to the end user, and the information which was extracted from the drive information and hashed, by using the side-band 6 (SMBus) before it becomes possible for the connected drive (the SSD 2) to access the memory 12 for the storage controller 1; and only if the drive is a proper drive, the linking-up of the communication channel (the in-band 5 (PCIe)) which can directly access the memory 12 can be permitted. Incidentally, the hashed product number (SN) of the drive is used as the hashed authentication information in the above explanation; however, this embodiment is not limited to this example and specific information of the drive other than the product number may be hashed and used as the hashed authentication information.

(5) Fifth Embodiment

An information processing apparatus (storage controller 1) according to a fifth embodiment provides a connected drive (SSD 2) with authorized firmware (FW) for the drive and verifies the authenticity of the drive on the basis of whether the firmware is applied to the drive or not.

Figure 11:
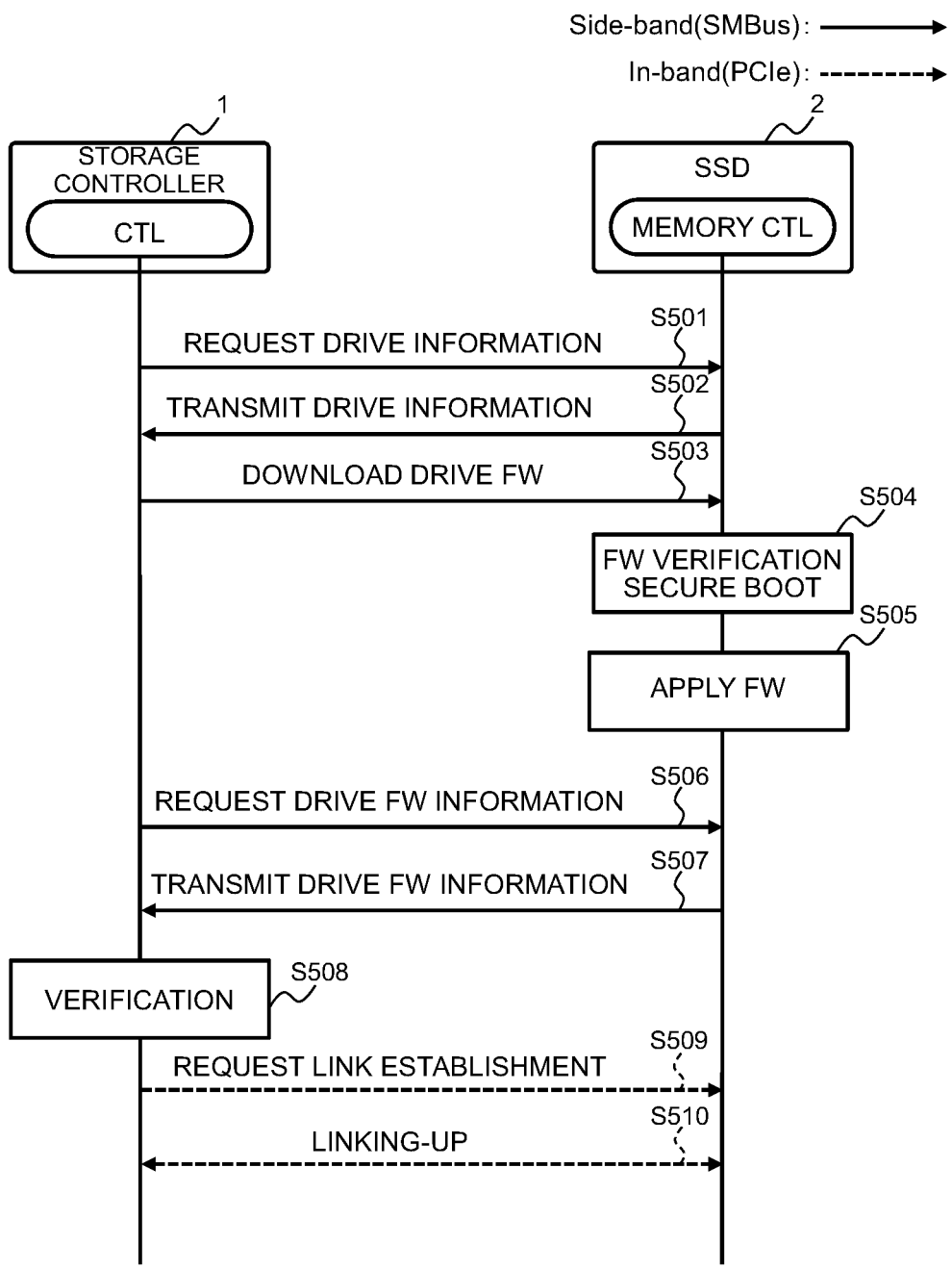
FIG. 11 is a ladder chart illustrating a processing procedure example of processing executed when connecting a drive according to a fifth embodiment.

FIG. 11 is a ladder chart illustrating a processing procedure example of processing executed when connecting a drive according to the fifth embodiment. The processing in FIG. 11 is started when the SSD 2 is physically connected to (or mounted in) the storage controller 1. The connection via the in-band 5 (PCIe) is not established at this point in time and the communication between the CTL for the storage controller 1 and the memory CTL for the SSD 2 is performed via the side-band 6 (SMBus).

Referring to FIG. 11, the CTL for the storage controller 1 firstly requests the connected SSD 2 to provide the drive information via the side-band 6 (step S501). Then, the memory CTL for the SSD 2 transmits the drive information of its own drive via the side-band 6 to the storage controller 1 in response to the request in step S501 (step S502). Incidentally, the drive information is, for example, VPD.

Next, the CTL for the storage controller 1 downloads the authorized firmware for the drive (drive FW) corresponding to the model number or the like of the SSD 2 to the SSD 2 (step S503). Regarding the drive FW, a plurality of kinds of FW according to the model number or the like of the drive are stored in the memory 12 and the corresponding FW may be selected from these kinds of FW on the basis of information described in the drive information received in step S502. Incidentally, it may be configured so that the drive FW is acquired from outside of the storage controller 1.

Next, the memory CTL for the SSD 2 verifies the drive FW received in step S503; and if the FW verification has been successful, secure boot of the SSD 2 is performed (step S504). The FW verification is, for example, form signing for verifying a signature attached to the drive FW; and if the signature is valid, the processor (the memory CTL) for the SSD 2 starts the secure boot for loading the drive FW. Assuming that a hardware-based unauthorized act has been performed with the firmware of the SSD 2, the FW verification would fail and, therefore, it would be impossible to perform any subsequent processing such as the application of FW. In such a case, a notice of failure of the FW verification may be sent to the storage controller 1 and the authentication failure notification unit 155 may report an error. Since the FW verification can use the aforementioned various methods, any detailed explanation about it is omitted.

Then, after the success in the FW verification and the activation by the secure boot, the memory CTL updates the firmware of the drive by applying the drive FW, which was received in step S503, to the SSD 2 (step S505).

Subsequently, the CTL for the storage controller 1 requests the SSD 2 to provide FW information of the drive (step S506). The memory CTL for the SSD 2 which has received the request in step S506 transmits the FW information of the drive after the FW update to the storage controller 1 (step S507). In this example, the FW information exchanged in steps S506 and S507 is assumed to include at least version (revision) information of the FW in order to use it for the verification in step S508 described later. Incidentally, if information other than the version information is used for the verification in step S508, the relevant information may be acquired from the SSD 2.

Next, the CTL verifies whether the SSD 2 has been updated to the authorized firmware or not by comparing the FW information of the drive, which was received in step S507, with the FW information of the authorized firmware transmitted to the SSD 2 in step S503 (step S508). Specifically, if the versions (revisions) of the FW match each other between the FW information of the drive FW downloaded to the SSD 2 and the FW information received from the SSD 2, the CTL can confirm that the SSD 2 has been updated to the authorized firmware. Then, if the update to the authorized firmware in the SSD 2 is successfully confirmed, the CTL can determine that the relevant SSD 2 is not an unauthorized drive, but is a proper drive. In other words, the verification in step S508 corresponds to the processing for verifying whether the SSD 2 is the proper drive or not. Then, if the CTL fails to confirm the update to the authorized firmware in step S508, the processing in step S509 and subsequent steps will not be performed.

If the update to the authorized firmware is successfully confirmed in step S508 (if it is determined that the SSD 2 is the proper drive), the establishment of the connection via the in-band 5 (PCIe) is permitted; and, therefore, the CTL requests the in-band controller 22 for the SSD 2 to establish the link via the in-band (step S509). Then, in response to the request in step S509, the in-band controller 22 performs the linking-up via the in-band 5 (step S510). Consequently, it becomes possible for the in-band controller 22 for the SSD 2 to directly access the memory 12 for the storage controller 1.

Figure 12:
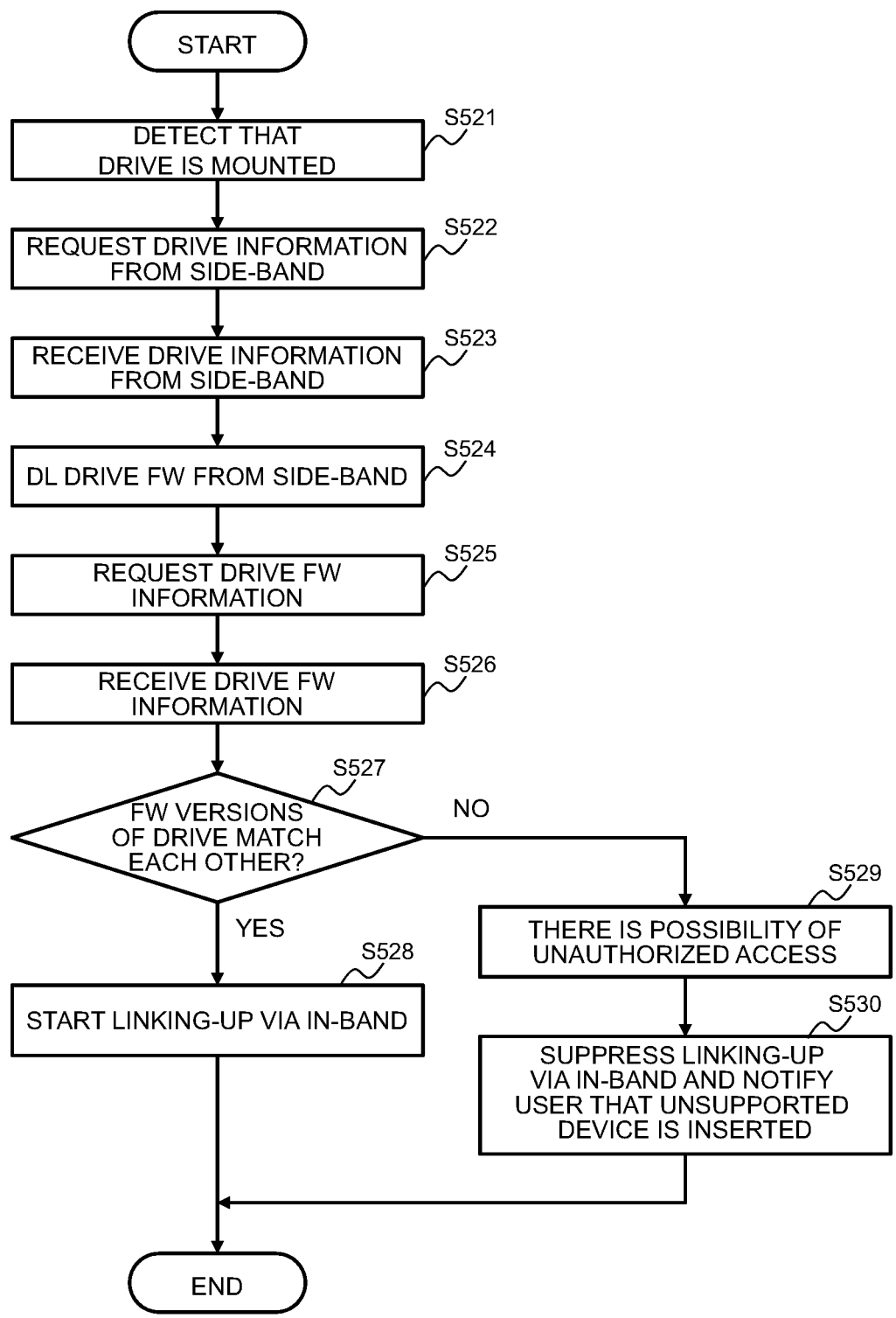
FIG. 12 is a flowchart illustrating a processing procedure example of authenticity verification processing according to the fifth embodiment.

FIG. 12 is a flowchart illustrating a processing procedure example of authenticity verification processing according to the fifth embodiment. FIG. 12 illustrates a processing procedure of processing executed by the CTL for the storage controller 1 (the switch 14 or the CPU 11) among the processing indicated in the ladder chart in FIG. 11 and the execution subject of the CTL will be made more clearer and be explained in detail.

Referring to FIG. 12, once the side-band control unit 141 detects the connection of the SSD 2 (step S521), the authentication information acquisition unit 151 requests the SSD 2 to provide the drive information by using the side-band 6 (step S522) and receives the drive information of the SSD 2 from the side-band controller 21 via the side-band 6 (step S523).

Next, the authentication information acquisition unit 151 downloads the authorized firmware for the drive (the drive FW) corresponding to the SSD 2 to the SSD 2 (step S524). In response to the provision of this drive FW, the drive FW is updated in the SSD 2 as explained with reference to FIG. 11.

After the completion of the update of the drive FW in the SSD 2, the authentication information acquisition unit 151 requests the SSD 2 to provide the FW information of the drive (step S525) and receives the FW information of the drive for the SSD 2 from the side-band controller 21 (step S526).

Subsequently, the verification arithmetic operation unit 153 judges whether or not the version of the drive indicated by the FW information received in step S526 matches the version of the drive FW downloaded to the SSD 2 in step S524 (step S527).

If the versions of the drive FW match each other in step S527 (YES in step S527), the verification arithmetic operation unit 153 determines that the drive (the SSD 2) detected in step S521 is the proper drive. When this happens, the in-band connection permission unit 154 executes the in-band connection control program 123 and requests the in-band controller 22 for the SSD 2 to establish the link via the in-band 5 and its response processing is executed, thereby staring the linking-up via the in-band 5 (step S528).

On the other hand, if the versions of the drive FW do not match each other in step S527 (NO in step S527), the verification arithmetic operation unit 153 determines that the drive (the SSD 2) detected in step S521 is not the proper drive, but may possibly be an unauthorized access (step S529). In this case, the in-band connection permission unit 154 executes the in-band connection control program 123 and suppresses the linking-up via the in-band 5 and the authentication failure notification unit 155 notifies the user that an unsupported device is inserted (step S530), thereby terminating the processing.

If the information processing apparatus (the storage controller 1) according to the fifth embodiment is employed as described above, the storage controller 1 provides the drive with the authorized firmware for the drive and the authenticity of the drive is judged on the basis of whether this authorized firmware is applied to the drive or not, by using the drive the side-band 6 (SMBus) before it becomes possible for the connected drive (the SSD 2) to access the memory 12 for the storage controller 1; and only if the drive is a proper drive, the linking-up of the communication channel (the in-band 5 (PCIe)) which can directly access the memory 12 can be permitted.

(6) Variations

The information processing apparatus (the storage controller 1) according to the present invention can adopt the following variations by combining the respective embodiments described above.

Firstly, the authenticity verification processing for verifying the authenticity of the drive may be executed not only when mounting the drive (the SSD 2) in the storage controller 1, but also every time the storage controller 1 is activated. By employing the above-described configuration, even if an authorized act is performed against the drive while the power source of the storage system is off, the authenticity of the drive is verified when the power source is on. So, it is possible to prevent the unauthorized drive from accessing the memory 12 for the storage controller 1.

Secondly, the storage controller 1 may use only the 3.3V power source, among the two kinds of the power sources (the 3.3V power source and the 12V power source), to supply the electric power to the SSD 2 until it is confirmed by the authenticity verification processing that the drive is a proper drive. The side-band 6 (SMBus) can be activated by just the 3.3V power source as explained earlier. By employing the above-described configuration, it is possible to verify the authenticity of the drive with low electric power without turning on the 12V power source at the early stage of mounting the drive in the storage system and to suppress the electric power load when mounting the drive.

Thirdly, if it is judged by the authenticity verification processing that the drive is not the proper drive (i.e., the drive is an unauthorized drive), the linking-up via the in-band 5 (PCIe) is rejected; however, in this case, it may be configured so that operations at the storage controller 1 are unrestricted. By employing the above-described configuration, the system will not be shut down as opposed to, for example, the technology disclosed in PTL 1 even if the unauthorized drive is mounted. So, it is possible to remove the unauthorized drive and continue the operations as the storage system.

REFERENCE SIGNS LIST

1: storage controller
2: SSD
3: host server
4: network
5: in-band
6: side-band
10: information processing system
11: CPU
12: memory
13: host I/F
14: switch
21: side-band controller
22: in-band controller
23: DRAM
24: NAND
110: expected value table
120: storage control program
121: connected drive verification program
122: side-band connection control program
123: in-band connection control program
124: NVMe drive control program
141: side-band control unit
142: in-band control unit
151: authentication information acquisition unit
152: decryption/hashing calculation unit
153: verification arithmetic operation unit
154: in-band connection permission unit
155: authentication failure notification unit

The invention claimed is:

1. An information processing apparatus capable of connecting a storage device having a plurality of kinds of interfaces, the information processing apparatus comprising:
a processor that executes programs and controls communication connection; and
a built-in memory that retains the programs and data,
wherein when the storage device is physically connected, a plurality of communication channels via the plurality of kinds of interfaces are formed between the storage device and the information processing apparatus;
wherein the plurality of communication channels include:
a first communication channel via a first interface not directly linked to the built-in memory and incapable of accessing the built-in memory even when the communication connection is established; and
a second communication channel via a second interface directly linked to the built-in memory and capable of accessing the built-in memory when the communication connection is established;
wherein when the storage device is physically connected and at a specified timing when the communication connection via the second communication channel is not established, the processor:
executes authenticity verification processing for verifying authenticity of the storage device on the basis of information acquired from the storage device by using the first communication channel; and
permits establishment of the communication connection via the second communication channel when the authenticity is confirmed by the authenticity verification processing,
wherein encrypted authentication information which is obtained by encrypting specific information of the storage device is written to the storage device in advance; and
wherein in the authenticity verification processing, the processor verifies the authenticity by acquiring the specific information and the encrypted authentication information in the storage device via the first communication channel and comparing information obtained by decrypting the encrypted authentication information with the specified information.

2. The information processing apparatus according to claim 1,
wherein in the authenticity verification processing, the processor verifies the authenticity by acquiring a specified type of drive information in the storage device via the first communication channel and comparing the drive information with specified pattern data retained in the built-in memory.

3. The information processing apparatus according to claim 1,
wherein specified authentication information indicating that the storage device is a proper drive is written to the storage device in advance; and
wherein in the authenticity verification processing, the processor verifies the authenticity by acquiring the authentication information in the storage device via the first communication channel and comparing the authentication information with specified pattern data retained in the built-in memory.

4. The information processing apparatus according to claim 1,
wherein hashed authentication information which is obtained by hashing specific information of the storage device is written to the storage device in advance; and
wherein in the authenticity verification processing, the processor verifies the authenticity by acquiring the specific information and the hashed authentication information in the storage device via the first communication channel and comparing information obtained by hashing the specific information with the hashed authentication information.

5. The information processing apparatus according to claim 1, wherein in the authenticity verification processing, the processor:
provides the storage device with authorized firmware via the first communication channel;
acquires firmware information of the storage device via the first communication channel after application of the firmware in the storage device; and
verifies the authenticity by comparing a version of the firmware indicated in the acquired firmware information with a version of the provided authorized firmware.

6. The information processing apparatus according to claim 1,
wherein the first interface is an SMBus interface and the second interface is a PCIe interface.

7. An information processing apparatus capable of connecting a storage device having a plurality of kinds of interfaces, the information processing apparatus comprising:
a processor that executes programs and controls communication connection;
a built-in memory that retains the programs and data; and
at least two kinds of power sources with different amounts of electric power consumption as power sources for supplying electric power to the storage device,
wherein when the storage device is connected, a plurality of communication channels via the plurality of kinds of interfaces are formed between the storage device and the information processing apparatus,
wherein the plurality of communication channels include:
a first communication channel via a first interface incapable of accessing the built-in memory even when the communication connection is established, and
a second communication channel via a second interface capable of accessing the built-in memory when the communication connection is established,
wherein only a power source with small electric power consumption of a degree capable of activating the first interface is used until a verification result of the authenticity verification processing is obtained, and
wherein at a specified timing when the communication connection via the second communication channel is not established, the processor:
executes authenticity verification processing for verifying authenticity of the storage device on the basis of information acquired from the storage device by using the first communication channel; and
permits establishment of the communication connection via the second communication channel when the authenticity is confirmed by the authenticity verification processing.

8. A method for verifying authenticity of a storage device by an information processing apparatus capable of connecting the storage device having a plurality of kinds of interfaces, the information processing apparatus including:
a processor that executes programs and controls communication connection; and
a built-in memory that retains the programs and data,
wherein when the storage device is physically connected to the information processing apparatus, a plurality of communication channels via the plurality of kinds of interfaces are formed between the storage device and the information processing apparatus;
wherein the plurality of communication channels include:
a first communication channel via a first interface not directly linked to the built-in memory and incapable of accessing the built-in memory even when the communication connection is established; and
a second communication channel via a second interface directly linked to the built-in memory and capable of accessing the built-in memory when the communication connection is established; and
wherein when the storage device is physically connected and at a specified timing when the communication connection via the second communication channel is not established, the processor:
executes authenticity verification processing for verifying authenticity of the storage device on the basis of information acquired from the storage device by using the first communication channel; and
permits establishment of the communication connection via the second communication channel when the authenticity is confirmed by the authenticity verification processing,
wherein encrypted authentication information which is obtained by encrypting specific information of the storage device is written to the storage device in advance; and
wherein in the authenticity verification processing, the processor verifies the authenticity by acquiring the specific information and the encrypted authentication information in the storage device via the first communication channel and comparing information obtained by decrypting the encrypted authentication information with the specified information.

9. A program executed by an information processing apparatus capable of connecting a storage device having a plurality of kinds of interfaces,
the information processing apparatus including a processor and a built-in memory,
wherein when the storage device is physically connected to the information processing apparatus, a plurality of communication channels via the plurality of kinds of interfaces are formed between the storage device and the information processing apparatus;
wherein the plurality of communication channels include:
a first communication channel via a first interface not directly linked to the built-in memory and incapable of accessing the built-in memory even when the communication connection is established; and a second communication channel via a second interface directly linked to the built-in memory and capable of accessing the built-in memory when the communication connection is established;

wherein when the storage device is physically connected and at a specified timing when the communication connection via the second communication channel is not established, the program causes the processor to execute:
  processing for acquiring specified information from the storage device by using the first communication channel;
  processing for verifying authenticity of the storage device on the basis of the acquired information; and
  processing for permitting establishment of the communication connection via the second communication channel when the authenticity is confirmed by the verification, wherein encrypted authentication information which is obtained by encrypting specific information of the storage device is written to the storage device in advance; and wherein in the authenticity verification processing, the processor verifies the authenticity by acquiring the specific information and the encrypted authentication information in the storage device via the first communication channel and comparing information obtained by decrypting the encrypted authentication information with the specified information.

* * * * *